United States Patent [19]

Peterson

[11] Patent Number: 5,017,309
[45] Date of Patent: May 21, 1991

[54] LIQUID CONTACT PLATE AND SUPPORT SYSTEM FOR COOLING TOWERS

[76] Inventor: Charles A. Peterson, 2201 Lord Ashley Dr., Sanford, N.C. 27330

[21] Appl. No.: 551,566

[22] Filed: Jul. 11, 1990

[51] Int. Cl.⁵ .............................................. B01F 3/04
[52] U.S. Cl. ............................ 261/111; 261/DIG. 72
[58] Field of Search ...................... 261/111, DIG. 72; 292/DIG. 38, 80, 87

[56] References Cited

U.S. PATENT DOCUMENTS

| | | | |
|---|---|---|---|
| 3,751,017 | 8/1973 | Lemmens | 261/111 |
| 4,178,333 | 12/1979 | Shepherd | 261/111 |
| 4,396,559 | 8/1983 | Nutter | 261/112.1 |
| 4,451,411 | 5/1984 | Le Fevre | 261/111 |
| 4,552,394 | 11/1985 | Kesselman | 292/307 B |
| 4,728,468 | 3/1988 | Duke | 261/111 |
| 4,793,100 | 12/1988 | Harding et al. | 292/DIG. 38 |
| 4,868,956 | 9/1989 | Shepherd | 261/111 |

*Primary Examiner*—Tim Miles
*Attorney, Agent, or Firm*—Olive & Olive

[57] ABSTRACT

A liquid cooling tower construction incorporates a tower fill assembly with liquid contact plates. The liquid contact plates interconnect in abutting relation utilizing mating support and releasable latch elements on the abutting sides of adjoining liquid contact plates. Thus, in each tier level, the liquid contact plates making up that tier level are effectively locked together but in a manner which enables the individual liquid contact plates to be detachably separated and removed whenever necessary.

2 Claims, 2 Drawing Sheets

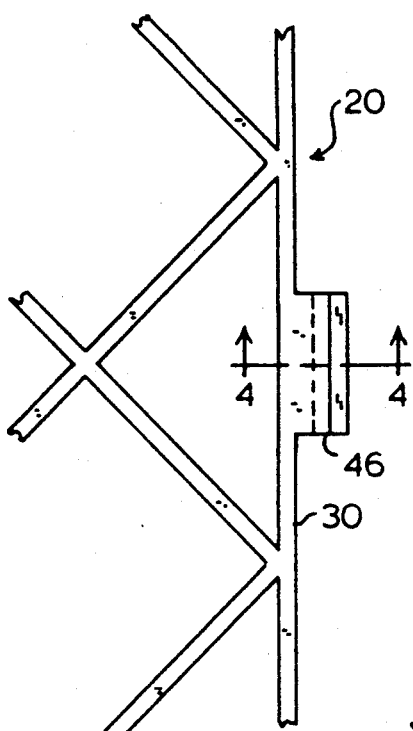
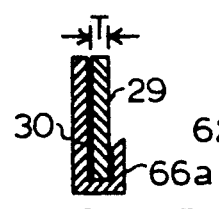
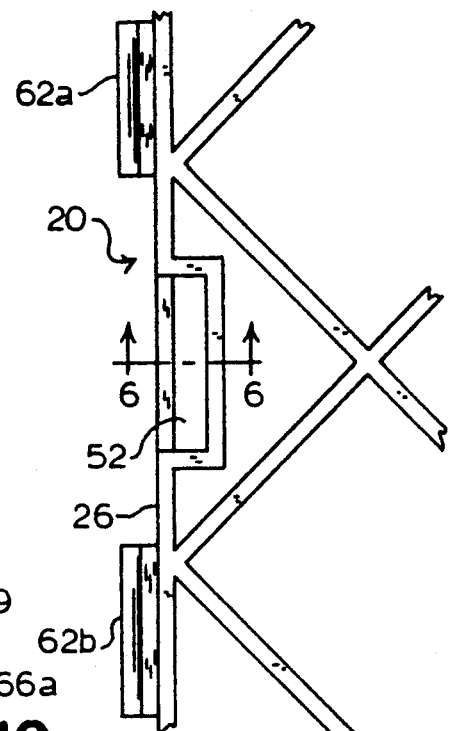
FIG. 3  FIG. 10  FIG. 5
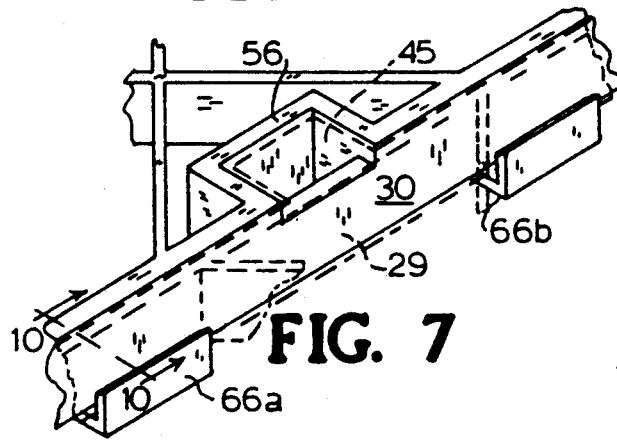
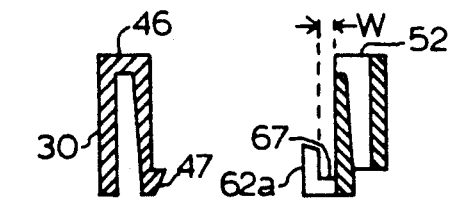
FIG. 7  FIG. 4  FIG. 6
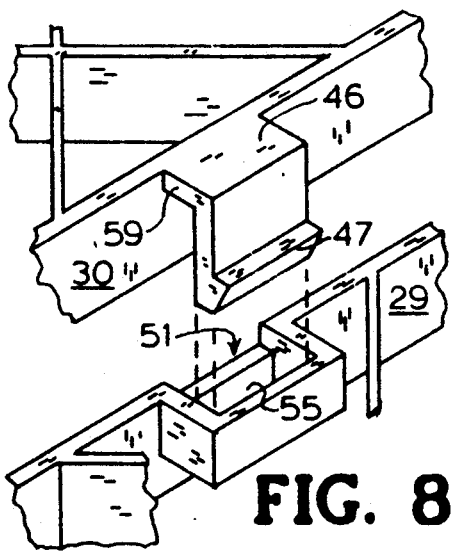
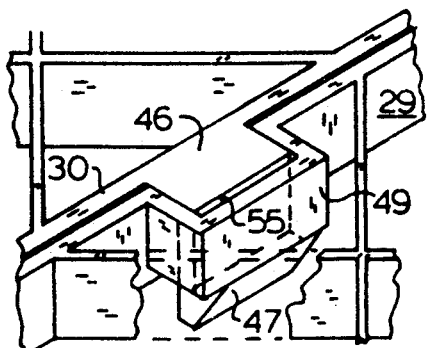
FIG. 8  FIG. 9

LIQUID CONTACT PLATE AND SUPPORT SYSTEM FOR COOLING TOWERS

CROSS REFERENCE TO RELATED APPLICATION

The present application relates to and describes an improvement over the subject matter of copending U.S. patent application Ser. No. 07/467,959, filed Jan. 22, 1990 entitled "COOLING TOWER LIQUID CONTACT PLATE SUPPORT SYSTEM".

BACKGROUND OF INVENTION

1. Field of Invention

The subject matter of the present invention relates to liquid cooling towers of the type in which the liquid to be cooled flows downwardly within the tower through a series of vertically spaced grid or lattice-like structures referred to here as liquid contact plates and more specifically relates to an improved liquid contact plate support system for such cooling towers.

2. Background Art

In the general mode of operation of a cooling tower, a fan in the top of the cooling tower is actuated and draws air in through an opening at the base of the tower and upwardly through the tower to be exhausted to the atmosphere. Water at a relatively high temperature is fed into the top of the tower in a convenient manner. The water falls under the action of gravity through what is referred to as the tower fill assembly and is collected at the bottom of the tower. The descending water is contacted by the upwardly flowing atmosphere air which cools the water and enables the water to be reintroduced into an air conditioning system or other process using the water at a lower temperature than that at which the water entered the cooling tower. The present invention is primarily directed to the construction of the liquid contact plates which make up the cooling tower fill assembly and more specifically to a construction which enables the liquid contact plates to be interconnected and supported as an integral assembly at each tier level within the cooling tower.

In one type of support system, the liquid contact plates are joined to each other by a type of bracket such as shown in U.S. Pat. No. 3,751,017. A plurality of liquid contact plates are operatively connected together by the brackets at the different elevations and are effectively stacked one liquid contact layer above the other in a tier-like arrangement. A plurality of laterally spaced flexible strands are supported from the top of the tower and passed through the various tiers of liquid contact plates. Suitable clamps are secured below the liquid contact plates to support the tier of contact plates above. The use of brackets to join the liquid contact plates together at each tier level has not proven satisfactory for many reasons among which has been the need for a very large quantity of brackets and the lack of providing a secure attachment for holding the various liquid contact plates in a particular tier level together.

While fluid contact plates have been interconnected in vertical arrays as in U.S. Pat. No. 4,728,468, so far as applicant is aware, it had not been previously known, prior to applicant's copending application Ser. No. 07/467,959, to form liquid contact plates so as to eliminate the need for the corner brackets while permitting the sides of the liquid contact plates to be abutted and interconnected one with the other to form relatively rigid tiers of liquid contact plates one above the other. Providing a still further improved connecting means for liquid contact plates which permits the sides of one liquid contact plate to be detachably but firmly connected to the sides of surrounding liquid contact plates becomes the principle object of the present invention. Other objects will become apparent as the description proceeds.

SUMMARY OF INVENTION

A liquid contact plate according to the invention is molded of a suitable plastic as an integral piece. Each side of the liquid contact plate is molded with a series of supports which mate with and interengage with the side of an adjacent liquid contact plate. Opposing sides of adjacent liquid contact plates are also provided with mating latches and latch receptacles. Each latch on one side of a liquid contact plate is received by a latch receptacle in an opposed position on one side of an adjacent liquid contact plate. Thus, in each tier level, the liquid contact plates making up that tier level are effectively supported by each other and are locked together but in a manner which enables the individual liquid contact plates to be detachably separated and removed whenever necessary.

BRIEF DESCRIPTION OF DRAWINGS

FIG. 3 is an enlarged fragmentary detail plan view of one of the self-locking latch-male connectors.

FIG. 4 is an enlarged fragmentary detailed section view taken substantially along line 4—4 of FIG. 3 through the latch-male connector.

FIG. 5 is an enlarged fragmentary detail plan view of the female latch receptacle.

FIG. 6 is an enlarged fragmentary detail section view taken substantially along line 6—6 of FIG. 5 through the female-latch receptacle.

FIG. 7 is a fragmentary perspective view of a female-latch receptacle.

FIG. 8 is a fragmentary perspective view of a latch-male connector approaching a female-latch receptacle.

FIG. 9 is a fragmentary perspective view of a fully latched latch-male connector and female-latch receptacle.

DESCRIPTION OF PREFERRED EMBODIMENT

As will be apparent from the description to follow, the present invention is primarily directed to the construction of the individual liquid contact plates such that a plurality of individual liquid contact plates made according to the present invention can be interconnected together to form an integral layer of liquid cooling elements as part of a tier or one of a stack of liquid cooling elements in a cooling tower. Reference may be made to my prior copending application Ser. No. 07/467,959 for background information the contents of which are deemed incorporated herein by reference and over which the present application represents an improvement.

For background, it again may be noted that in the general operation of a cooling tower, a fan draws air in through openings at the base of a tower housing. The air passes upwardly through the tower and exits through a nozzle to the atmosphere. Water at a relatively high temperature is fed into the top of the tower by a suitable distributor and falls under the action of gravity through the cooling tower fill assembly made up of the individual liquid contact plates. Each tier of liquid contact plates is supported by a plurality of flexible vertical strands which pass through suitably formed and suitably positioned grooves or holes in the liquid contact plates. The upwardly flowing air cools the water and the water collects in a basin at the base of the tower where it becomes available for being reintroduced into the air conditioning system or other liquid using process at a lower temperature than that at which the water entered the cooling tower. With the foregoing as background, it is to be noted that the present invention is directed to providing an improved means for interconnecting and supporting the liquid contact plates in each tier of the tower.

Referring next to FIGS. 1–9 for a description of the present invention, each liquid contact plate 20 made according to the invention is molded as an integral unit and preferrably is of a square shape, about two feet by two feet in size and approximately one and one-half pounds in weight. Each individual liquid contact plate 20 may have a thickness of approximately one to two inches depending on the application. Molded side bars 24, 26, 28 and 30 support a lattice-like liquid cooling, perforate grid made up of molded intersecting strips 32, 34. Other forms of lattice-like grids and other dimensions may be substituted for that described. It is to be understood that all of the liquid contact plates in each tier level are interconnected according to the invention in a manner to be described. Thus, at each tier level the liquid contact plates present a substantially integral cooling assembly.

Figure 1:
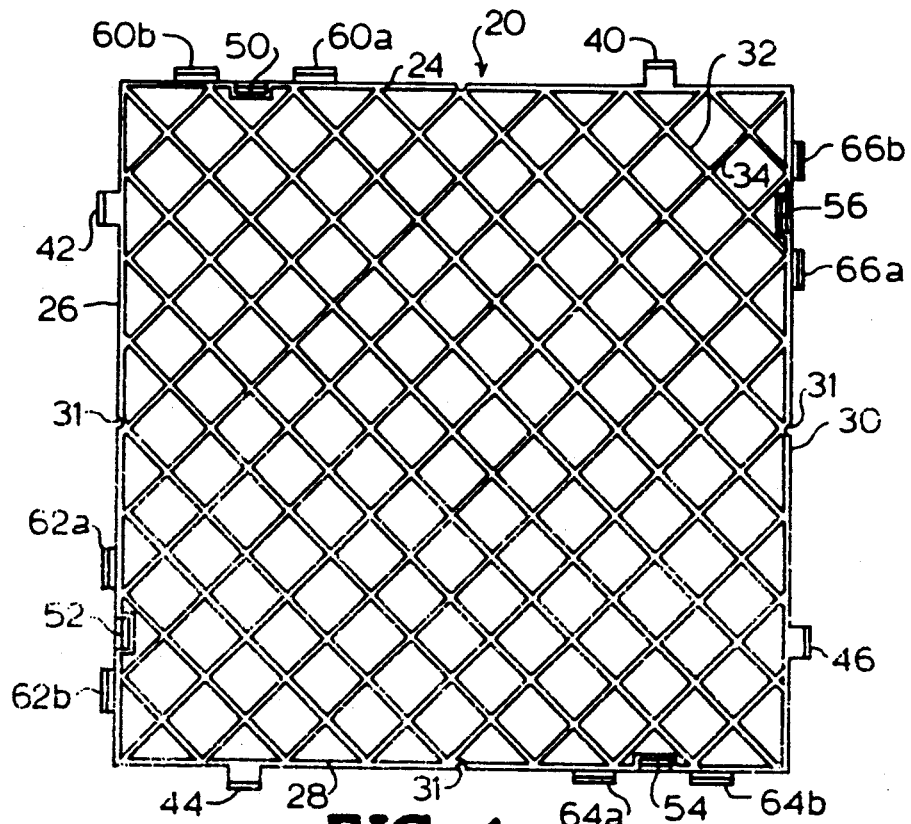
FIG. 1 is a top plan view of a liquid contact plate made according to the present invention.

Making reference to FIG. 1, the representative liquid contact plate 20 according to the invention utilizes the molded side bars 24, 26, 28 and 30 of rectangular cross section to support the molded intersecting strips 32, 34 and to thereby form a perforate surface for cooling the liquid which drips through the various tiers of the tower. Side bars 24, 26, 28 and 30 have respective latch-male connectors 40, 42, 44 and 46, respective female-latch receptacles 50, 52, 54 and 56 and on opposite sides of each female-latch receptacle a respective pair of bar supports 60a, 60b, 62a, 62b, 64a, 64b and 66a, 66b.

Figure 2:
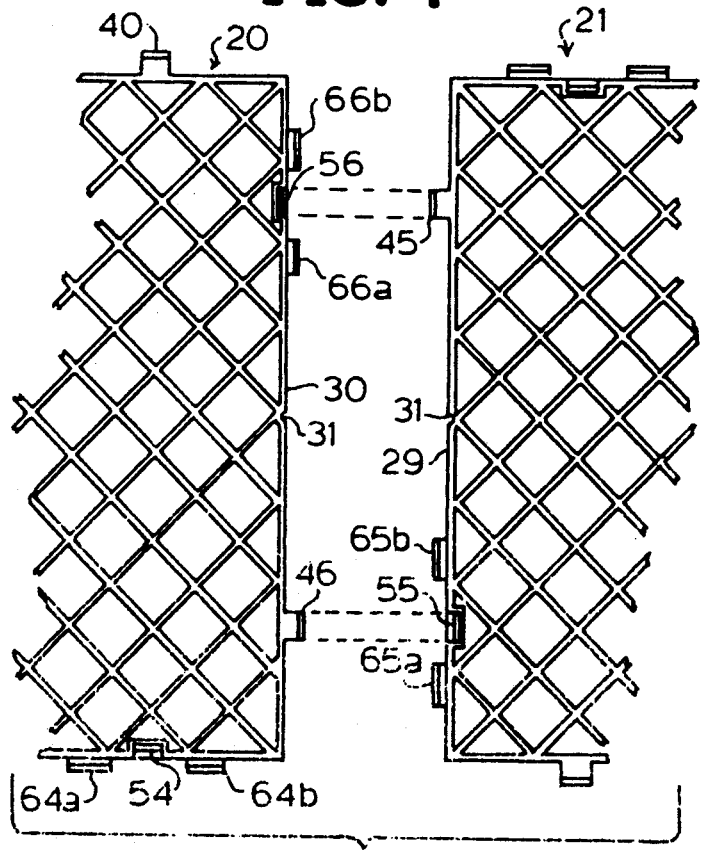
FIG. 2 is a partial top plan view of one side of a liquid contact plate made according to the present invention approaching another mating side of another liquid contact plate made according to the invention to perfect an interconnection between the plates.

Each male-latch connector on one side bar is designed to mate with an opposed female-latch receptacle on an opposed side bar as further illustrated in FIGS. 2, 8 and 9. In FIG. 2, the liquid contact plate 20 of FIG. 1 is shown being joined to an adjacent liquid contact plate 21 having a side bar 29 which is intended to be nested in bar supports 66a, 66b at the same time side bar 30 of liquid contact plate 30 is nested in bar supports 65a, 65b. As part of the same joining operation male-latch connector 46 on side bar 30 of liquid contact plate 20 is intended to be latched into the female-latch receptacle 55 with male-latch connector 45 on side bar 29 of liquid contact plate 21 being intended to be latched into the female-latch receptacle 56 on side bar 30 of liquid contact plate 20. A typical latch assembly is shown in FIG. 7 in which side bar 30 shown in solid lines of liquid contact plate 20 is shown adjacent side bar 29 shown in dashed lines of liquid contact plate 21 with male-latch connector 45, shown in dashed lines, latched into female-latch receptacle 56 and side bar 29 resting on side bar supports 66a, 66b.

Using side bar supports 66a, 66b as representative examples, the side bar support width W (FIG. 6) permits the side bar thickness T (FIG. 10) to be snugly received and the side bar support base 67 (FIG. 6) is located such that the upper surfaces of the repective joined side bars such as side bars 29, 30 in FIG. 7 assume substantially the same level as depicted in FIG. 10.

Also to be noted particularly in reference to FIGS. 4–9 is that each male-latch connector, e.g. male-latch connector 46, has a certain resilence and has a locking tab 47 (FIG. 4, 8 and 9) which snaps outwardly underneath the outer wall of the female-latch receptacle such as outer wall 49 of female-latch receptacle 55 (FIG. 9) when the respective male-latch connector 46 is fully depressed thus snugly securing the respective side bars such as side bars 29 and 30 together as in FIG. 9. A notch such as notch 51 in female-latch receptacle 55 (FIG. 8) is formed in each female latch receptacle and allows the upper protruding arm 59 (FIG. 8) to nest so as to make the upper surfaces of the secured together side bars reside at the same level as seen for example in FIG. 10.

In summary, it can be seen that the liquid contact plate construction of the present invention enables each liquid contact plate in each layer or tier of liquid contact plates to be interconnected to all other surrounding liquid contact plates. Each layer or tier thus effectively becomes an integral filtering element but with the ability to quickly disassemble either a portion or all of such layer or tier. The need for corner brackets has also been eliminated.

I claim:

1. A liquid contact plate which is one of a plurality of similarly constructed liquid contact plates forming a series of vertically spaced horizontal tiers within a liquid cooling tower, said liquid contact plate being formed as an integral molded piece and comprising:
 (a) side bars forming a rectangular frame and having inner and outer side surfaces;
 (b) a plurality of intersecting ribs extending between and integrally joined to said side bars inner surfaces and forming a perforate planar structure for cooling a liquid passed therethrough;
 (c) a pair of spaced apart bar supports appended to and protruding outwardly from each said side bar outer surface and shaped for supporting a side bar of another liquid contact plate in abutting relation;
 (d) a female-latch receptacle located between each said pair of bar supports and defining a generally vertical hollow channel protruding outwardly from the side bar outer surface therebetween and formed by a pair of side walls, an outer wall joining outer ends of said side walls and a portion of the side bar outer surface enclosed thereby; and
 (e) a downwardly extending generally vertical male-latch member appended to and supported outwardly from each said side bar outer surface at a location spaced from the location at which said bar supports are located, said male-latch member being shaped to be received by a said female-latch receptacle channel on a side bar of another liquid contact plate to be abutted against the side bar on which the said male-latch member is located and having a ledge portion adapted to engage a bottom edge of the female-latch receptacle outer wall to lock the engaged male-latch member and female-latch receptacle together to hold the respective side bars on which each is located together in abutting relation.

2. A liquid contact plate claimed in claim 1 wherein the upper portion of each said side bar from which each said female-latch receptacle extends is notched and a supporting portion of said male-latch member is formed to nest in said notch.

* * * * *